United States Patent
Keino et al.

(10) Patent No.: US 11,063,871 B2
(45) Date of Patent: Jul. 13, 2021

(54) COMMUNICATION APPARATUS, COMMUNICATION METHOD, NON-TRANSITORY RECORDING MEDIUM, AND COMMUNICATION SYSTEM

(71) Applicant: TOYOTA JIDOSHA KABUSHIKI KAISHA, Toyota (JP)

(72) Inventors: Hiroki Keino, Toyota (JP); Taichi Matsumura, Toyota (JP); Kotaro Hara, Nagoya (JP); Yohsuke Okada, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 65 days.

(21) Appl. No.: 16/425,044

(22) Filed: May 29, 2019

(65) Prior Publication Data

US 2020/0036637 A1     Jan. 30, 2020

(30) Foreign Application Priority Data

Jul. 25, 2018   (JP) .............................. JP2018-139364

(51) Int. Cl.

| H04L 12/803 | (2013.01) |
|---|---|
| H04L 12/841 | (2013.01) |
| H04L 12/40 | (2006.01) |
| H04L 12/26 | (2006.01) |
| H04L 12/851 | (2013.01) |

(52) U.S. Cl.
CPC ........ *H04L 47/125* (2013.01); *H04L 12/4015* (2013.01); *H04L 43/0858* (2013.01); *H04L 47/24* (2013.01); *H04L 47/283* (2013.01); H04L 2012/40215 (2013.01)

(58) Field of Classification Search
CPC . H04L 47/125; H04L 47/283; H04L 12/4015; H04L 43/0858; H04L 47/24; H04L 2012/40215; H04L 47/22
See application file for complete search history.

(56) References Cited

U.S. PATENT DOCUMENTS

| 2003/0156595 A1* | 8/2003 | Kishigami | .............. | H04L 49/90 |
| | | | | 370/445 |
| 2003/0200366 A1* | 10/2003 | Kondo | ...................... | G06F 5/06 |
| | | | | 710/52 |
| 2011/0208884 A1* | 8/2011 | Horihata | ........... | H04L 12/40143 |
| | | | | 710/105 |

FOREIGN PATENT DOCUMENTS

| EP | 1094639 A2 | 4/2001 |
| JP | 2001-119416 A | 4/2001 |

\* cited by examiner

*Primary Examiner* — Peter P Chau
(74) *Attorney, Agent, or Firm* — Oliff PLC

(57) ABSTRACT

A communication apparatus includes an electronic control unit configured to manage transmission timing of predetermined data to the network, transmit the data to the network based on the transmission timing, measure an actual transmission time, determine whether the actual transmission time exceeds a specified transmission time, when the transmitted data is predetermined control object data, when determination is made that the actual transmission time is equal to or less than the specified transmission time, set next transmission timing of the control object data to be the predetermined period, and when the transmitted data is the control object data, when determination is made that the actual transmission time exceeds the specified transmission time, delay next transmission timing of the control object data by a predetermined waiting time with respect to the predetermined period.

10 Claims, 4 Drawing Sheets

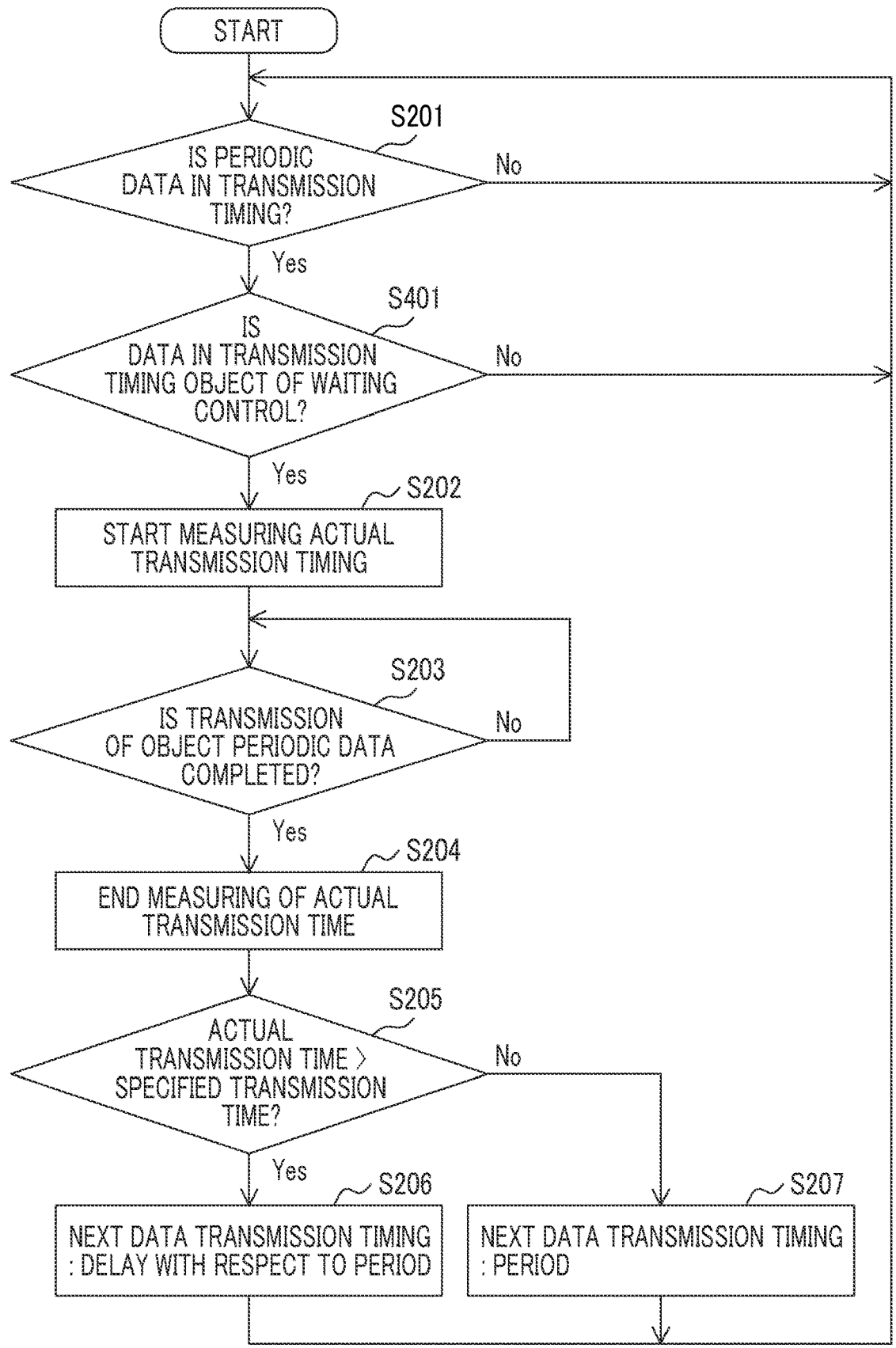

COMMUNICATION APPARATUS, COMMUNICATION METHOD, NON-TRANSITORY RECORDING MEDIUM, AND COMMUNICATION SYSTEM

INCORPORATION BY REFERENCE

The disclosure of Japanese Patent Application No. 2018-139364 filed on Jul. 25, 2018 including the specification, drawings and abstract is incorporated herein by reference in its entirety.

BACKGROUND

Technical Field

The disclosure relates to a communication apparatus that is communicably connected over a network, a communication method, a non-transitory computer readable recording medium that stores a program, and a communication system.

Description of Related Art

A communication system is known which is configured to allow tens to hundreds of communication apparatuses to be connected by a network such as a controller area network (CAN) and enable data (or messages) to be transmitted and received between the communication apparatuses. In the communication system, when a plurality of communication apparatuses attempts to transmit data to the network at or around the same time, a communication load temporarily increases, and thus communication delay increases.

As a solution for the aforementioned problem, Japanese Unexamined Patent Application Publication No. 2001-119416 (JP 2001-119416 A) discloses a technique (dynamic method) for controlling timing of data transmission in response to occurrence of communication delay to level the communication load of a network. In the technique disclosed in JP 2001-119416 A, the number of times of transmission waiting (defeated transmission) that may occur for data having low priority contending with data having high priority is counted, and, when the count number reaches a predetermined value, the priority of the data having low priority is made higher (for example, by changing a priority flag or changing CAN_ID to a smaller value). In this way, increase in communication delay of the data having low priority is suppressed.

As another solution for the problem, there is a technique (static method) for presetting timing of data transmission in a design stage so as to level the communication load of a network.

SUMMARY

In the technique disclosed in JP 2001-119416 A, it is necessary to count the number of times of defeated transmission for data that fails to be transmitted. However, the counting function is not the standard function of most communication protocol, and thus has to be implemented by separate software. In addition, since it is necessary to add a processing interface between the communication protocol and the software, the system configuration becomes complicated and a burden increases.

Furthermore, in the technique disclosed in JP 2001-119416 A, the priority of data that has experienced defeated transmission many times is changed to be higher (for example, decreasing CAN_ID) so as to facilitate successful transmission. However, when information regarding the above-mentioned change is not shared among communication apparatuses, the communication apparatuses may not normally receive data, which may affect the operation of the system and thus lay an undue burden on the system.

Meanwhile, in the method of statically leveling the communication load of the network, since the communication apparatuses have different power on/off timings, rising times, or the like, it is necessary to design the system in anticipation of variation of communication load. Therefore, it is difficult to produce the optimal design to efficiently utilize communication resources of the network.

The disclosure provides a communication apparatus, a communication method, a non-transitory computer readable recording medium that stores a program, and a communication system capable of leveling a communication load of a network with a minimized burden on a communication system and reducing the maximum communication delay time occurring in the network.

A first aspect of the disclosure relates to a communication apparatus that transmits data to another communication apparatus connected over a network. The communication apparatus includes an electronic control unit. The electronic control unit is configured to manage transmission timing of predetermined data, which is requested to be transmitted in a predetermined period, to the network, transmit the data to the network according to a predetermined communication protocol, based on the transmission timing, measure an actual transmission time from the transmission timing until completion of the transmission of the data to the network, determine whether the actual transmission time exceeds a predetermined specified transmission time, when the transmitted data is predetermined control object data, when determination is made that the actual transmission time is equal to or less than the specified transmission time, set next transmission timing of the control object data to be the predetermined period, and when the transmitted data is the control object data, when determination is made that the actual transmission time exceeds the specified transmission time, delay next transmission timing of the control object data by a predetermined waiting time with respect to the predetermined period.

According to the first aspect, it is possible to level the communication load of the network with the minimum burden on the communication system, and to reduce the maximum communication delay time that occurs in the network.

A second aspect of the disclosure relates to a communication method executed by a communication apparatus connected over a network. The communication method includes determining whether predetermined data is in a transmission timing, determining whether the data in the transmission timing is predetermined control object data, when the data is the control object data, measuring an actual transmission time from the transmission timing until completion of the transmission of the control object data to the network, determining whether the actual transmission time exceeds a predetermined specified transmission time, setting next transmission timing of the control object data to be a predetermined period when the actual transmission time is equal to or less than the specified transmission time, and delaying next transmission timing of the control object data by a predetermined waiting time with respect to the predetermined period when the actual transmission time exceeds the specified transmission time.

A third aspect of the disclosure relates to a non-transitory computer readable recording medium that stores a program to cause a communication apparatus connected over a network to execute a process. The process includes determining whether predetermined data is in a transmission timing, determining whether the data in the transmission timing is predetermined control object data, when the data is the control object data, measuring an actual transmission time from the transmission timing until completion of the transmission of the control object data to the network, determining whether the actual transmission time exceeds a predetermined specified transmission time, setting next transmission timing of the control object data to be a predetermined period when the actual transmission time is equal to or less than the specified transmission time, and delaying next transmission timing of the control object data by a predetermined waiting time with respect to the predetermined period when the actual transmission time exceeds the specified transmission time.

A fourth aspect of the disclosure relates to a communication system. The communication system includes a plurality of communication apparatuses connected to each other over a network. The communication apparatus includes an electronic control unit configured to manage transmission timing of predetermined data, which is requested to be transmitted in a predetermined period, to the network, transmit the data to the network according to a predetermined communication protocol, based on the transmission timing, measure an actual transmission time from the transmission timing until completion of the transmission of the data to the network, determine whether the actual transmission time exceeds a predetermined specified transmission time, when the transmitted data is predetermined control object data, when determination is made that the actual transmission time is equal to or less than the specified transmission time, set next transmission timing of the control object data to be the predetermined period, and when the transmitted data is the control object data, when determination is made that the actual transmission time exceeds the specified transmission time, delay next transmission timing of the control object data by a predetermined waiting time with respect to the predetermined period.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a flowchart of communication control executed by a communication apparatus according to the modified example.

DETAILED DESCRIPTION OF EMBODIMENTS

Embodiment

In a communication apparatus capable of transmitting data to another communication apparatus connected over a network according to a present embodiment, when the actual time from transmission timing of data to completion of transmission to the network does not exceed a specified time, next transmission timing of data is delayed with respect to a predetermined period. As a result, since the base point of the data transmission period of at least one of a plurality of contending data is shifted with respect to those of others, it is possible to level the communication load of the network, and to reduce the maximum communication delay time of periodic data that would experience many defeated transmission.

Configuration

Figure 1:
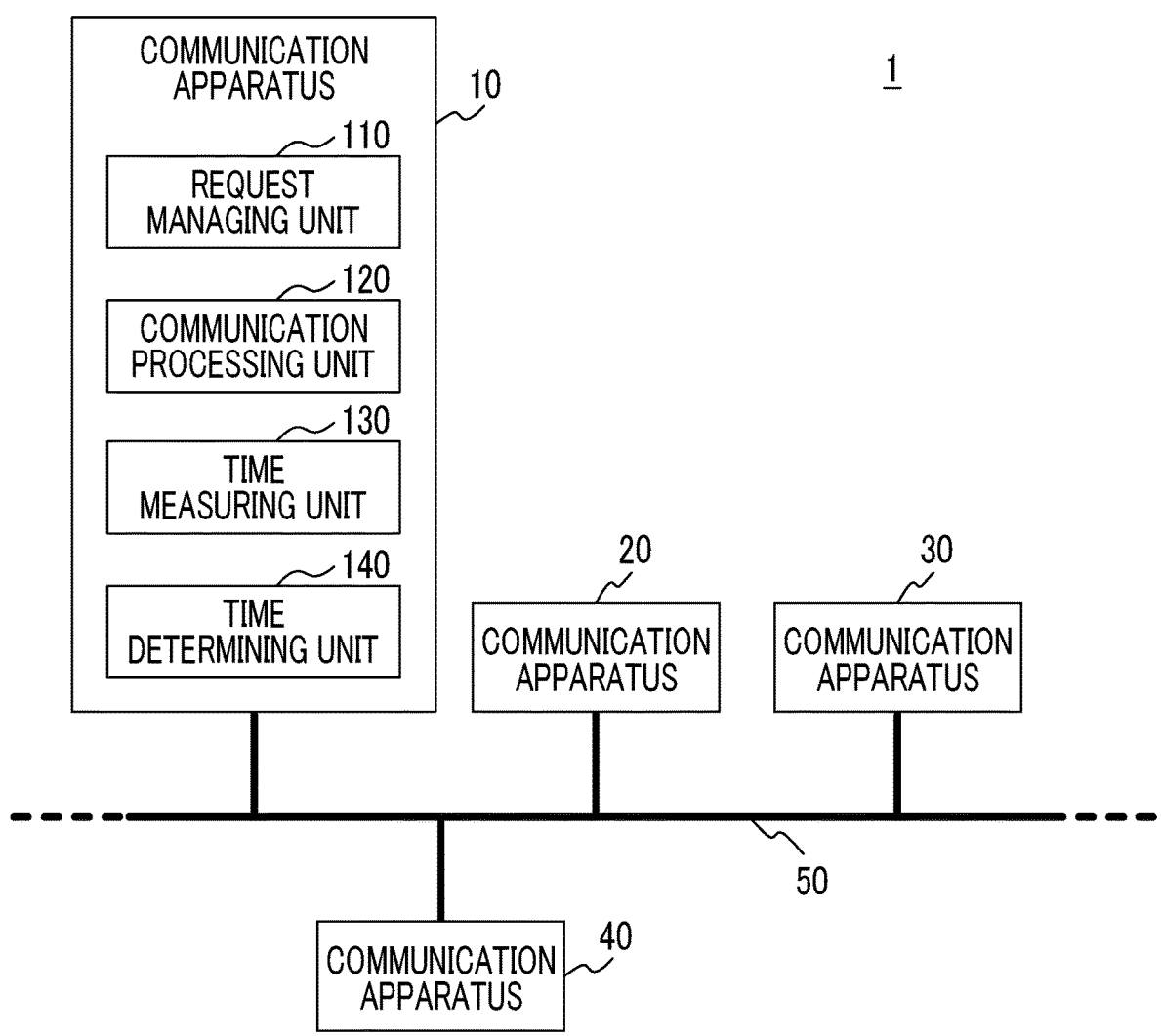
FIG. 1 is a view of a configuration example of a communication system and communication apparatuses according to an embodiment.

FIG. 1 is a view of a configuration example of a communication system 1 according to an embodiment of the disclosure. In the communication system 1 shown in FIG. 1, a plurality of communication apparatuses 10, 20, 30, 40 is communicably connected to each other over a network 50.

The network 50 is, for example, a communication bus for performing transmission and reception of data (or messages) according to a communication protocol such as CAN or CAN with flexible data rate (CAN-FD).

The communication apparatuses 10, 20, 30, 40 are typically electronic control units (ECUs) including a processor such as a CPU, a memory, an input/output interface, and the like. The processor reads and executes a program (control software) stored in a memory, such that the communication apparatuses 10, 20, 30, 40 can carry out each function of a request managing unit 110, a communication processing unit 120, a time measuring unit 130, and a time determining unit 140, which are shown in the communication apparatus 10 of FIG. 1 as a representative. Hereinafter, each function of the request managing unit 110, the communication processing unit 120, the time measuring unit 130, and the time determining unit 140 will be described.

The request managing unit 110 manages timing of transmitting data from the communication apparatus 10 to other communication apparatuses 20, 30, 40. Data includes data that is requested to be transmitted based on a predetermined period (hereinafter, referred to as "periodic data") and other data, for example, data that is generated in a burst manner (hereinafter, referred to as "non-periodic data"). The request managing unit 110 can manage the data transmission timing for at least one of periodic data. The data transmission timing of the periodic data can be managed, for example, using the counter expiring at the count of the periodic time. The request managing unit 110 delays the data transmission timing of the periodic data by a predetermined time (hereinafter, referred to as a "waiting time") with respect to the predetermined period, based on a determination result of the time determining unit 140, which will be described later.

In response to the data transmission timing, the communication processing unit 120 performs processing of transmitting the periodic data or non-periodic data to the network 50 requested according to a predetermined communication protocol. The communication protocol is, for example, a CAN communication protocol or a CAN-FD communication protocol. In a case of the CAN communication protocol, there is a rule that the smaller the number of CAN_ID added to data is, the higher the priority is. For this reason, when the data transmission timing of the host communication apparatus contends with the data transmission timing of another communication apparatus, the communication processing unit 120 can transmit, to the network 50, the data having CAN_ID with the lowest number as the highest priority (successful transmission), and can transmit the data having CAN_ID with the number other than the lowest number after waiting for a while (defeated transmission). Then, the communication processing unit 120 determines whether the transmission of data to the network 50 has been completed through the successful transmission and the defeated transmission.

When the data transmission timing of the periodic data is reached, the time measuring unit 130 measures the actual time (hereinafter, referred to as an "actual transmission time") taken to complete the transmission of the periodic data to the network 50 by the communication processing unit 120 from the data transmission timing. The length of the actual transmission time varies depending on the communication load amount per hour in the network 50 and the like. For example, when the periodic data can be immediately transmitted without contending with the data transmission timing from another communication apparatus, the actual transmission time is measured to be relatively short, and when the number of times of waiting of data transmission increases due to defeated transmission from contending with the data transmission timing from another communication apparatus, the actual transmission time is measured to be relatively long.

The time determining unit 140 compares the actual transmission time measured by the time measuring unit 130 to a predetermined specified transmission time. The specified transmission time is used to determine whether the communication load is high due to congestion of the network 50. As an example, the specified transmission time is set to be the waiting time that is permitted in the communication system 1 as the time from the data transmission timing of the periodic data to the completion of the transmission of the periodic data. The setting of the specified transmission time to the waiting time makes it possible to suppress the processing load of the communication apparatus and suppress the delay of the periodic data beyond the permitted time of the communication system 1. In addition, the specified transmission time may be set to be the time shorter than the waiting time that is permitted in the communication system 1, and may be decided, for example, based on the waiting time and the communication load amount per hour in the network 50. The setting of the specified transmission time to the time shorter than the waiting time makes it possible to level the communication load of the network 50 at an early stage. Then, the time determining unit 140 notifies the request managing unit 110 of the result obtained by comparing the actual transmission time to the specified transmission time.

In FIG. 1, an example in which four communication apparatuses 10, 20, 30, 40 are connected to the network 50 is illustrated, but the number of the communication apparatuses connected to the network 50 is not limited thereto. In addition, functions of the request managing unit 110, the communication processing unit 120, the time measuring unit 130, and the time determining unit 140 may be provided to all communication apparatuses connected to the network 50, or may be provided to some of them. For example, load can be alleviated by not applying the functions to the communication apparatus that do not have sufficient processing capability. In the embodiment, just by the fact that at least one communication apparatus has the above-mentioned functions, it is possible to achieve a useful effect that the communication load on the network 50 can be leveled and, at the same time, the maximum communication delay time occurring in the network 50 can be reduced.

Control

Figure 2:
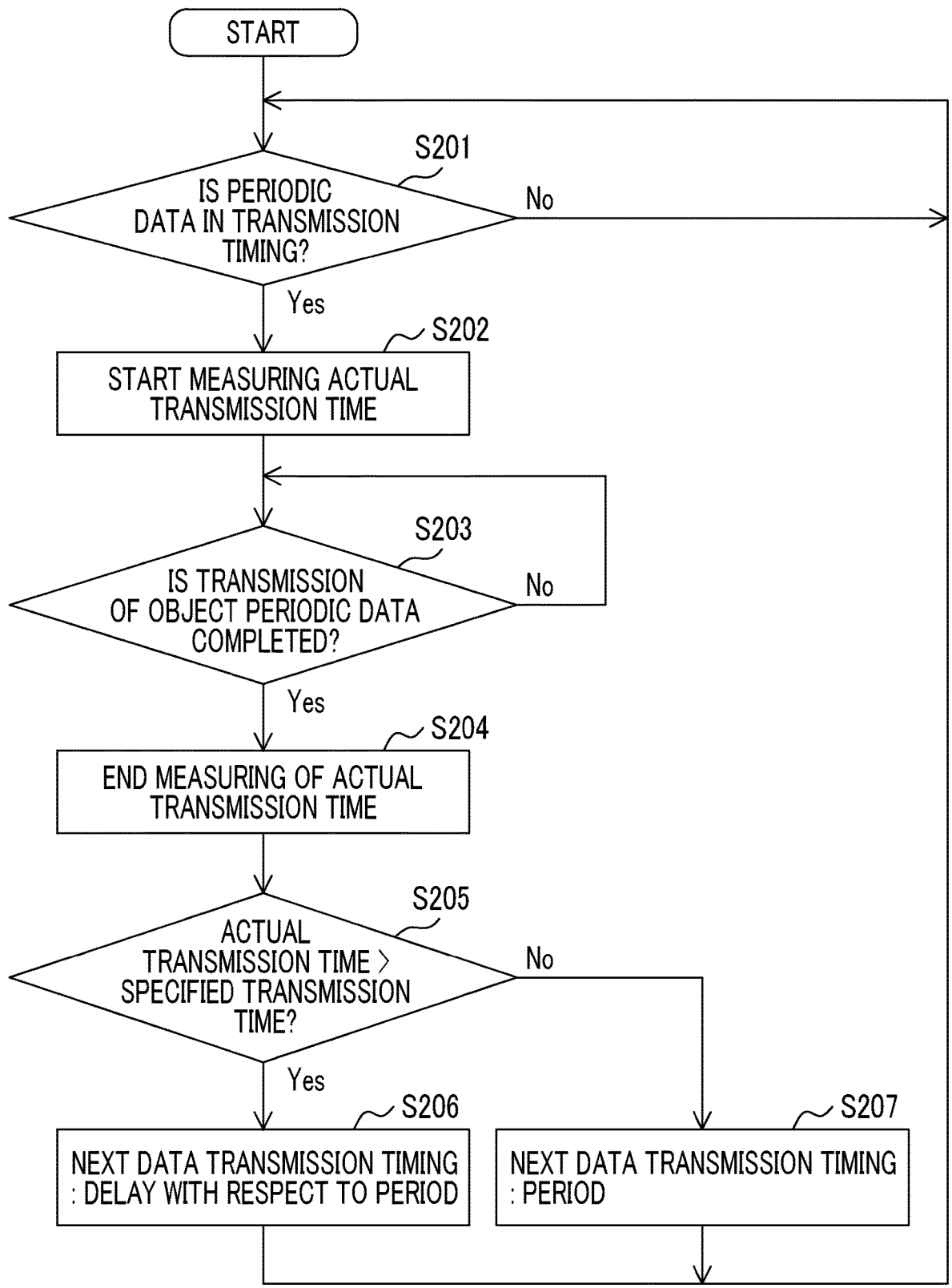
FIG. 2 is a flowchart of communication control executed by a communication apparatus according to the embodiment.

With reference to FIG. 2, a communication control executed by the communication apparatus according to the embodiment will be described. FIG. 2 is a flowchart showing a process procedure of the communication control executed by the communication apparatus that has the functions of the request managing unit 110, the communication processing unit 120, the time measuring unit 130, and the time determining unit 140.

The process shown in FIG. 2 starts by activating the communication apparatuses 10, 20, 30, 40 having the functions described above, and is executed in parallel in response to occurrence of data transmission request. The communication apparatuses 10, 20, 30, 40 are activated when power is supplied due to an action such as accessory on (ACC_ON), ignition on (IG_ON), a battery connection to a battery terminal (+B_ON).

Step S201

The request managing unit 110 determines whether predetermined periodic data is in the transmission timing. For example, when the periodic data is data in which the transmission request occurs at a cycle of 10 ms, the transmission timing comes in principle at a time interval of 10 ms. The period can be measured using a time counter or the like, and the transmission timing can be determined by determining the expiration of the counter value.

When the periodic data is in the transmission timing (Yes in S201), the process proceeds to step S202, whereas when the periodic data is not in the transmission timing (No in S201), the process of step S201 is repeatedly executed.

Step S202

With the data transmission timing as a trigger, the time measuring unit 130 starts measuring the actual transmission time of the periodic data of which transmission is to be performed (hereinafter, referred to as "object periodic data") based on the transmission timing. Further, the communication processing unit 120 starts transmission processing of the object periodic data to the network 50.

Step S203

The communication processing unit 120 determines whether the transmission of the object periodic data to the network 50 is completed. For example, when there is no other data that contends with the object periodic data for transmission and when there is other data that contends with the object periodic data for transmission and the priority order of the other data is relatively low, the transmission of the object periodic data is immediately completed. On the other hand, when there is another data contending with the object periodic data for transmission and having a higher priority, the transmission of the object periodic data is completed after waiting until the transmission of the other data is completed.

When the transmission of the object periodic data is completed (Yes in S203), the process proceeds to step S204, and when the transmission of the object periodic data is not completed (No in S203), the processing of step S203 is repeatedly executed.

Step S204

The time measuring unit 130 finishes the measuring of the actual transmission time that has been executed for the object periodic data.

Step S205

The time determining unit 140 determines whether the measured actual transmission time exceeds a predetermined specified transmission time. The specified transmission time is used to determine the height of the communication load of the network 50 as described above. For example, it is assumed that, for the object periodic data of the predetermined period of "10 ms," the permitted waiting time "20 ms" is set to be the specified transmission time. In this case, when the actual transmission time measured by the time measuring unit 130 is 20 ms or less, determination is made that the communication load of the network 50 is not high, and when the actual transmission time exceeds 20 ms, determination is made that the communication load of the network 50 is high.

When the actual transmission time exceeds the specified transmission time (Yes in S205), the process proceeds to step S206, and when the actual transmission time does not exceed the specified transmission time (No in S205), the process proceeds to step S207.

Step S206

The request managing unit 110 delays the next data transmission timing of the object periodic data transmitted from the communication processing unit 120 by a predetermined waiting time with respect to the predetermined period. The waiting time can be appropriately set for each communication system 1 in consideration of the content and importance of the periodic data, the minimum value of the cycle in the communication protocol, and the like. As an example, since the cycle of the CAN communication protocol is set in units of several milliseconds, the waiting time can be set to 1 ms. In this case, for the object periodic data having the above-mentioned predetermined period of 10 ms, the next data transmission timing is delayed by 1 ms of the waiting time. For example, when the above-mentioned counter is used, the next times may be set to expire with the count of "the predetermined period plus the waiting time (which is equal to 11 ms)". In principle, the delay of the transmission timing due to the above-mentioned processing is only executed once in the next time and then ended, and returns to the predetermined period at the next transmission timing. Determination of whether to delay the next transmission timing is made according to the determination of step S205 in the next process routine.

With the waiting control, for example, it is possible to avoid, at the next data transmission timing, a situation where data transmission timings of the object periodic data and other periodic data, which occur in each time a cycle starts, are overlapped and the transmission of the object periodic data is delayed accordingly.

Step S207

The request managing unit 110 manages the next data transmission timing of the object periodic data transmitted from the communication processing unit 120 at the predetermined period as before.

After step S206 and step S207 have ended, the process returns to step S201 and determination is made again by the request managing unit 110 whether the predetermined periodic data is in the data transmission timing.

Operation and Effect

With the communication system according to the embodiment described above, in each communication apparatus, the actual transmission time from the data transmission timing to the transmission completion is measured for the periodic data, determination is made that the communication load of the network is high when the measured time exceeds the specified transmission time from waiting and the like due to defeated transmission by other data having high priority, and the next data transmission timing is delayed with respect to the predetermined period.

When contention for data transmission timing occurs and the communication load on the network locally increases under the waiting control, the base point of the data transmission period can be shifted for at least one of a plurality of contending periodic data (in the embodiment, the periodic data of a relatively low priority). Through the above-mentioned process, the base point of the period is adjusted such that contention for the data transmission timing is eliminated. As a result, it is possible to level the communication load of the network, and reduce the maximum communication delay time of the periodic data with a lot of defeated transmissions. Therefore, it is possible to reduce the processing load of the communication apparatus.

In addition, with the communication system according to the embodiment, in each communication apparatus, the number of defeated transmissions of data is not needed to be counted and dynamic change of the information for determining the priority order such as CAN_ID is not made. That is, since the configuration of the communication system and the format of the periodic data are not changed, the burden imposed on the communication system by the communication control can be minimized.

Furthermore, since the variation of data transmission timing in each communication apparatus can be absorbed by the waiting control, even when the communication load of the network is statically leveled, it is possible to reduce the design margin, which leads to optimally efficient design of the communication resources of the network.

Modified Example

In the embodiment, the example has been described in which the communication apparatus having the functions of the request managing unit 110, the communication processing unit 120, the time measuring unit 130 and time determining unit 140 applies waiting control for shifting the base point of the period at the time of request contention to all periodic data in which data transmission request occurs in the host apparatus.

Figure 3:
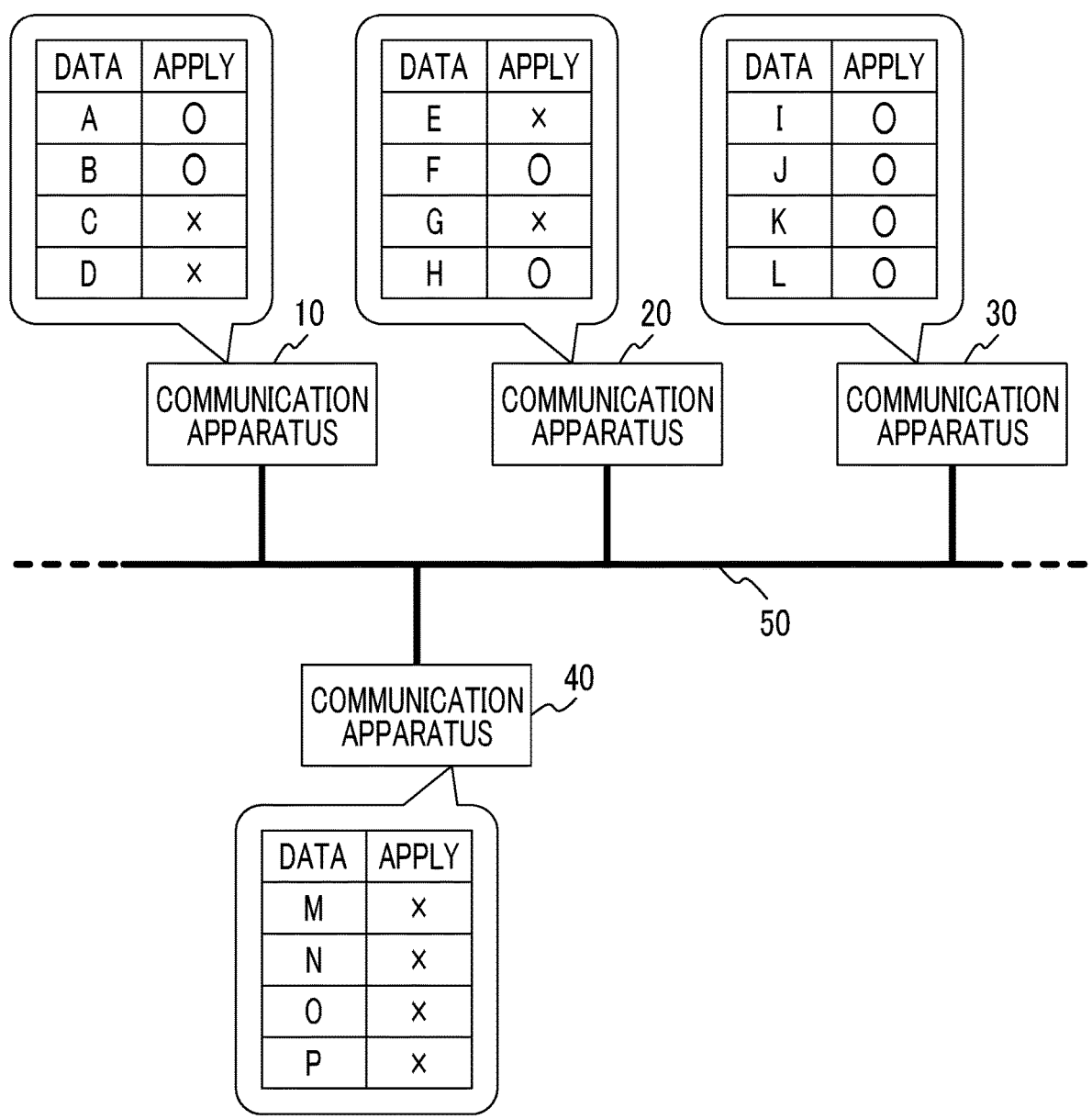
FIG. 3 is a view of a configuration example of a communication system and communication apparatuses according to a modified example.

However, the waiting control may be applied to some of periodic data in which data transmission request occurs in the communication apparatus. Determination whether the periodic data is object data can be made using an object list as illustrated in FIG. 3, for example. In the object list illustrated in FIG. 3, the communication apparatus 10 applies waiting control to the periodic data A, B among periodic data A, B, C, D, the communication apparatus 20 applies waiting control to periodic data F, H among periodic data E, F, G, H, the communication apparatus 30 applies waiting control to all of periodic data I, J, K, L, and the communication apparatus 40 applies waiting control to all of periodic data M, N, O, P.

FIG. 4 shows a flowchart showing a process procedure of communication control executed by a communication apparatus according to the modified example. As shown in FIG. 4, when the request managing unit 110 determines that it is the data transmission timing of periodic data in the communication control according to the modified example (Yes in step S201), the request managing unit 110 refers to the object list to determine whether the periodic data, which is in the data transmission timing, is the object of the waiting control (Step S401) before the time measuring unit 130 starts measuring an actual transmission time (Step S202). In addition, the determination in Step S401 may be made by a unit other than the request managing unit 110 (for example, an object data determining unit, or the like).

With the communication control of the modified example, although the effect of leveling the communication load of the network 50 and the effect of reducing the maximum communication delay time of periodic data with a lot of defeated transmission are reduced, it is possible to reduce the processing load of the communication apparatus by narrowing down the periodic data to be the object of waiting control to a part.

Although the disclosure has been described in connection with the embodiment, it is understood that the disclosure can be embodied as a communication apparatus, a communication system including communication apparatuses, a communication method that is executed by the communication apparatus, a communication program, and a non-transitory computer readable recording medium that stores a communication program, or a vehicle on which the communication system is mounted.

The disclosure can be used for a communication system in which a plurality of communication apparatuses is communicably connected over a network.

In the communication apparatus according to the first aspect of the disclosure, the specified transmission time may be set to be a waiting time that is permitted from the generation of the transmission request to the transmission of the data.

In the communication apparatus according to the first aspect of the disclosure, the specified transmission time may be set to be a predetermined time less than a waiting time based on the waiting time that is permitted from generation of the transmission request to the transmission of the data and a communication load amount per hour in the network.

In the communication apparatus according to the first aspect of the disclosure, the electronic control unit may be configured to select a predetermined part of a plurality of data that is requested to be transmitted, as the control object data.

In the communication method according to the second aspect of the disclosure, the specified transmission time may be set to be a waiting time that is permitted from generation of the transmission request to the transmission of the data.

In the communication method according to the second aspect of the disclosure, the specified transmission time may be set to be a predetermined time less than a waiting time based on the waiting time that is permitted from generation of the transmission request to the transmission of the data and a communication load amount per hour in the network.

In the communication method according to the second aspect of the disclosure, the control object data may be a predetermined part of a plurality of data that is requested to be transmitted.

What is claimed is:

1. A communication apparatus that transmits data to another communication apparatus connected over a network, the communication apparatus comprising an electronic control unit configured to:
    manage transmission timing of predetermined data, which is requested to be transmitted in a predetermined period, to the network,
    generate a transmission request for transmitting the predetermined data to the network according to a predetermined communication protocol, upon reaching the transmission timing,
    complete transmission by transmitting the predetermined data to the network,
    measure an actual transmission time taken from the transmission timing when the transmission request is generated until the completion of the transmission when the predetermined data is transmitted to the network,
    determine whether or not the actual transmission time exceeds a predetermined specified transmission time,
    when the predetermined data is predetermined control object data, and when determination is made that the actual transmission time is equal to or less than the specified transmission time, set next transmission timing of the control object data to be the predetermined period, and
    when the predetermined data is the control object data, and when determination is made that the actual transmission time exceeds the specified transmission time, delay next transmission timing of the control object data by a predetermined waiting time with respect to the predetermined period.

2. The communication apparatus according to claim 1, wherein the specified transmission time is set to be a waiting time that is permitted from the generation of the transmission request to the completion of the transmission.

3. The communication apparatus according to claim 1, wherein
    the specified transmission time is set based on (i) a waiting time that is permitted from the generation of the transmission request to the completion of the transmission and (ii) a communication load amount per hour in the network, and
    the specified transmission time is set to be a predetermined time less than the waiting time.

4. The communication apparatus according to claim 1, wherein the electronic control unit is further configured to select a predetermined part of a plurality of data that is requested to be transmitted, as the control object data.

5. A communication method executed by a communication apparatus that transmits data to another communication apparatus connected over a network, the communication method comprising:
    managing transmission timing of predetermined data, which is requested to be transmitted in a predetermined period, to the network;
    generating a transmission request for transmitting the predetermined data to the network according to a predetermined communication protocol, upon reaching the transmission timing;
    completing transmission by transmitting the predetermined data to the network,
    determining whether or not the predetermined data is predetermined control object data;
    when the predetermined data is the control object data, measuring an actual transmission time taken from the transmission timing when the transmission request is generated until the completion of the transmission when the predetermined data is transmitted to the network;
    determining whether or not the actual transmission time exceeds a predetermined specified transmission time;
    when the actual transmission time is equal to or less than the specified transmission time, setting next transmission timing of the control object data to be the predetermined period; and
    when the actual transmission time exceeds the specified transmission time, delaying next transmission timing of the control object data by a predetermined waiting time with respect to the predetermined period.

6. The communication method according to claim 5, wherein the specified transmission time is set to be a waiting time that is permitted from the generation of the transmission request to the completion of the transmission.

7. The communication method according to claim 5, wherein
    the specified transmission time is set based on (i) a waiting time that is permitted from the generation of the transmission request to the completion of the transmission and (ii) a communication load amount per hour in the network, and
    the specified transmission time is set to be a predetermined time less than the waiting time.

8. The communication method according to claim 5, wherein the control object data is a predetermined part of a plurality of data that is requested to be transmitted.

9. A non-transitory computer readable recording medium that stores a program to cause a communication apparatus that transmits data to another communication apparatus connected over a network, to execute a process comprising:
  managing transmission timing of predetermined data, which is requested to be transmitted in a predetermined period, to the network;
  generating a transmission request for transmitting the predetermined data to the network according to a predetermined communication protocol, upon reaching the transmission timing;
  completing transmission by transmitting the predetermined data to the network:
  determining whether or not the predetermined data is predetermined control object data;
  when the predetermined data is the control object data, measuring an actual transmission time taken from the transmission timing when the transmission request is generated until the completion of the transmission when the predetermined data is transmitted to the network;
  determining whether or not the actual transmission time exceeds a predetermined specified transmission time;
  when the actual transmission time is equal to or less than the specified transmission time, setting next transmission timing of the control object data to be the predetermined period; and
  when the actual transmission time exceeds the specified transmission time, delaying next transmission timing of the control object data by a predetermined waiting time with respect to the predetermined period.

10. A communication system comprising a plurality of communication apparatuses connected to each other over a network,
  wherein at least one communication apparatus among the plurality of communication apparatuses includes an electronic control unit configured to:
    manage transmission timing of predetermined data, which is requested to be transmitted in a predetermined period, to the network,
    generate a transmission request for transmitting the predetermined data to the network according to a predetermined communication protocol, upon reaching the transmission timing,
    complete transmission by transmitting the predetermined data to the network,
    measure an actual transmission time taken from the transmission timing when the transmission request is generated until the completion of the transmission when the predetermined data is transmitted to the network,
    determine whether or not the actual transmission time exceeds a predetermined specified transmission time,
    when the predetermined data is predetermined control object data, and when determination is made that the actual transmission time is equal to or less than the specified transmission time, set next transmission timing of the control object data to be the predetermined period, and
    when the predetermined data is the control object data, and when determination is made that the actual transmission time exceeds the specified transmission time, delay next transmission timing of the control object data by a predetermined waiting time with respect to the predetermined period.

* * * * *